United States Patent
Yanagi et al.

(10) Patent No.: US 9,318,943 B2
(45) Date of Patent: Apr. 19, 2016

(54) LINEAR MOTOR

(71) Applicant: KABUSHIKI KAISHA YASKAWA DENKI, Kitakyushu-shi (JP)

(72) Inventors: Keiji Yanagi, Kitakyushu (JP); Tatsuhiko Koba, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 331 days.

(21) Appl. No.: 13/931,129

(22) Filed: Jun. 28, 2013

(65) Prior Publication Data

US 2014/0203668 A1    Jul. 24, 2014

(30) Foreign Application Priority Data

Jan. 24, 2013    (JP) ................................. 2013-011098

(51) Int. Cl.
H02K 41/03    (2006.01)
H02K 1/17    (2006.01)

(52) U.S. Cl.
CPC ............... *H02K 41/031* (2013.01); *H02K 1/17* (2013.01)

(58) Field of Classification Search
None
See application file for complete search history.

(56) References Cited

U.S. PATENT DOCUMENTS

| 3,788,447 A * | 1/1974 | Stephanoff | B65G 23/00 198/619 |
| 5,302,872 A * | 4/1994 | Ohki | H02K 41/031 310/12.19 |
| 5,959,386 A * | 9/1999 | Knight | H02K 1/17 310/154.14 |
| 6,025,659 A * | 2/2000 | Nashiki | H02K 41/103 310/12.18 |
| 6,794,782 B2 * | 9/2004 | Mahfoudh | H02K 1/17 310/154.03 |
| 7,569,960 B2 * | 8/2009 | Hirabayashi | H02K 1/17 310/154.08 |
| 2008/0185929 A1 * | 8/2008 | Hirabayashi | H02K 1/17 310/154.14 |

FOREIGN PATENT DOCUMENTS

| JP | 09-098564 | 4/1997 |
| JP | 2001-086726 | 3/2001 |
| JP | 2012-105432 | 5/2012 |
| KR | 10-2005-0058328 | 6/2005 |

OTHER PUBLICATIONS

Korean Office Action for corresponding KR Application No. 10-2013-0070334, Jun. 26, 2014.
Japanese Office Action for corresponding JP Application No. 2013-011098, Mar. 14, 2014.
Chinese Office Action for corresponding CN Application No. 201310242542.5, Dec. 3, 2015.

* cited by examiner

*Primary Examiner* — Tran Nguyen
(74) *Attorney, Agent, or Firm* — Mori & Ward, LLP

(57) ABSTRACT

In a linear motor, one of a field system and an armature is configured as a mover and the other is configured as a stator. The field system relatively moves with respect to the armature. The field system includes two yoke boards which are arranged facing each other, a yoke base to which one side ends of the two yoke boards are to be fixed, a plurality of permanent magnets respectively fixed to facing surfaces of the two yoke boards and arranged along a moving direction of the mover, and an elastic member configured to apply force the facing surfaces of the two yoke boards in directions that other side ends of the two yoke boards move away from each other.

8 Claims, 6 Drawing Sheets

LINEAR MOTOR

CROSS-REFERENCE TO RELATED APPLICATION

The present application claims priority from Japanese Patent Application No. 2013-11098, which was filed on Jan. 24, 2013, the disclosure of which is incorporated herein by reference in its entirety.

BACKGROUND OF THE INVENTION

1. Field of the Invention
A disclosed embodiment relates to a linear motor.
2. Description of the Related Art
In prior arts, a coreless linear motor is known.

SUMMARY OF THE INVENTION

According to one aspect of the disclosure, there is provided a linear motor. In the linear motor, one of a field system and an armature is configured as a mover and the other is configured as a stator. The field system relatively moves with respect to the armature. The field system includes two yoke boards which are arranged facing each other, a yoke base to which one side ends of the two yoke boards are to be fixed, a plurality of permanent magnets respectively fixed to facing surfaces of the two yoke boards and arranged along a moving direction of the mover, and an elastic member configured to apply force the facing surfaces of the two yoke boards in directions that other side ends of the two yoke boards move away from each other.

DESCRIPTION OF THE EMBODIMENTS

In the following, an embodiment disclosed therein will be described with reference to the accompanying drawings. Incidentally, in the following description, a longitudinal direction (direction along a left back and a right front in FIG. 1) of the linear motor will be referred to as a "longitudinal direction", a width direction (direction along a left front and a right back in FIG. 1 and a lateral direction in FIG. 2) of the linear motor will be referred to as a "width direction", and a height-wise direction (a vertical direction in FIG. 1 and a vertical direction in FIG. 2) of the linear motor will be referred to as a "vertical direction".

Figure 1:
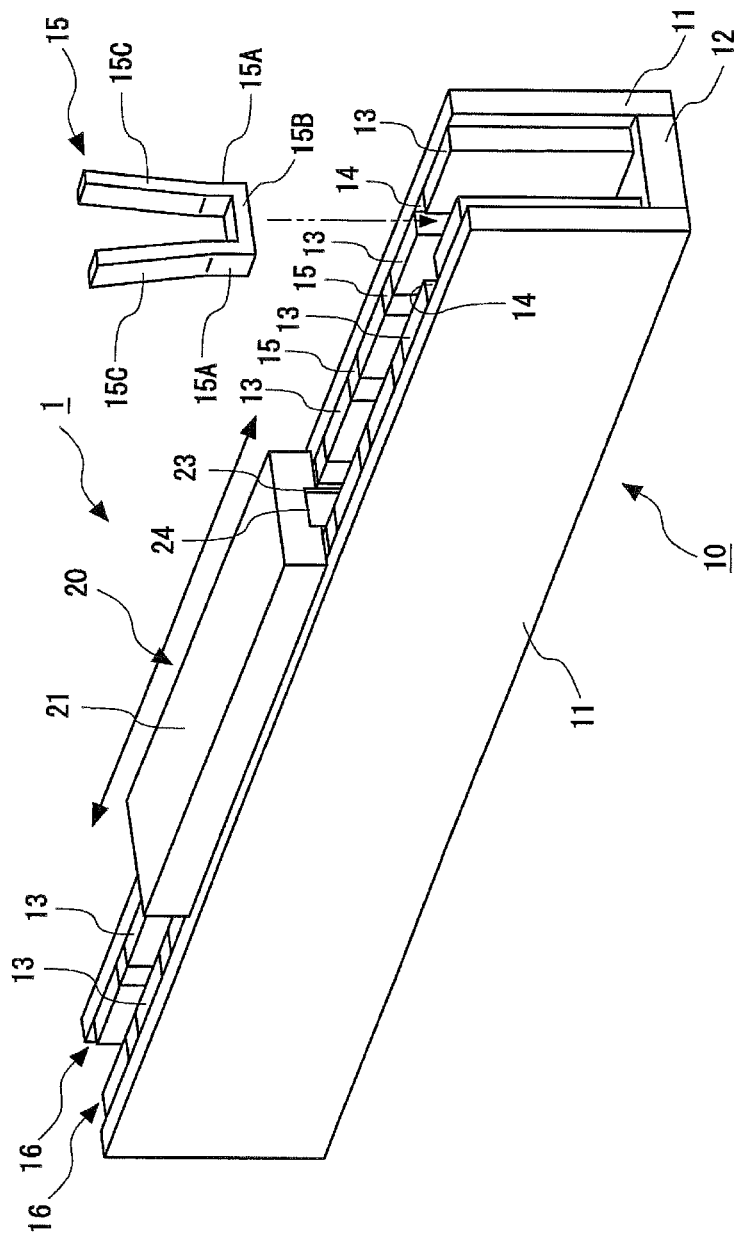
FIG. 1 is a perspective view illustrating an example of an exterior of a linear motor according to one embodiment.
Figure 2:
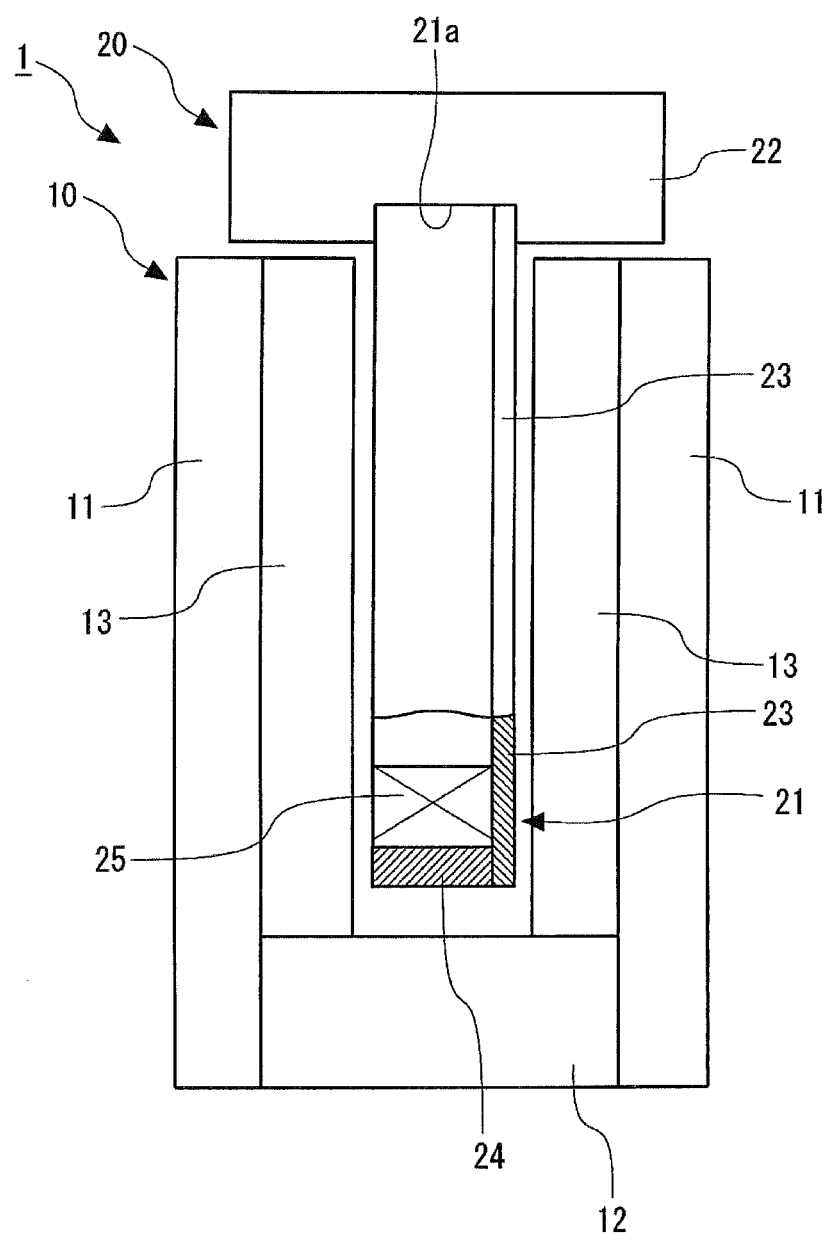
FIG. 2 is a front view of the linear motor.

<General Configuration of the Linear Motor>
As illustrated in FIG. 1 and FIG. 2, a linear motor 1 according to the present embodiment includes a stator 10 configured to be a field system and a mover 20 having an armature 21.

<Configuration of the Stator 10>
The stator 10 includes two arranged facing each other yoke boards 11, 11 (respectively corresponding to means for supporting a permanent magnet on one side and means for supporting a permanent magnet on the other side), a yoke base 12, a plurality of permanent magnets 13, and a plate spring 15. The permanent magnets 13 are arranged on facing surfaces of respective yoke boards 11 (inner side faces) where a pair of facing magnets is one set. In this case, each space 14 is formed between the respective two permanent magnets 13, 13 which are adjacent to each other along the longitudinal direction of the stator 10; and the plate spring 15 is arranged in each space 14.

The two yoke boards 11 are elongated and almost rectangular plates of the same shape each other. The yoke boards 11 are arranged to mutually face apart from each other in the width direction and also arranged across the stator 10 in the longitudinal direction.

The yoke base 12 has a shape of an almost plate form and is arranged across all of the stator 10 in the longitudinal direction. The yoke base 12 connects ends of one side (lower side in this example) of the two yoke boards 11, 11 to support the yoke boards 11, 11 in a cantilevered form. That is, the yoke base 12 corresponds to means for fixing one side end of means for supporting the permanent magnets of one side and one side end of means for supporting the permanent magnets of the other side. Incidentally, in order to stably support the plate springs 15, a plurality of recessed parts 12b are discretely formed in an upper surface of the yoke base 12 in the longitudinal direction. Each of the recessed parts 12b is extended in the width direction. Alternatively, the two yoke boards 11, 11 and the yoke base 12 may be integrated into a U-shaped form.

Each of the plurality of permanent magnets 13 is shaped into the form of an almost rectangular plate having a width along the longitudinal direction. Such a plurality of groups of permanent magnets 13 are arranged in parallel along the longitudinal direction (corresponding to a moving direction of the mover) of the stator 10 leaving the predetermined spaces 14. Accordingly, permanent magnet arrays 16 which are extended along the longitudinal direction are formed on inner surfaces of the respective yoke boards 11.

Figure 3:
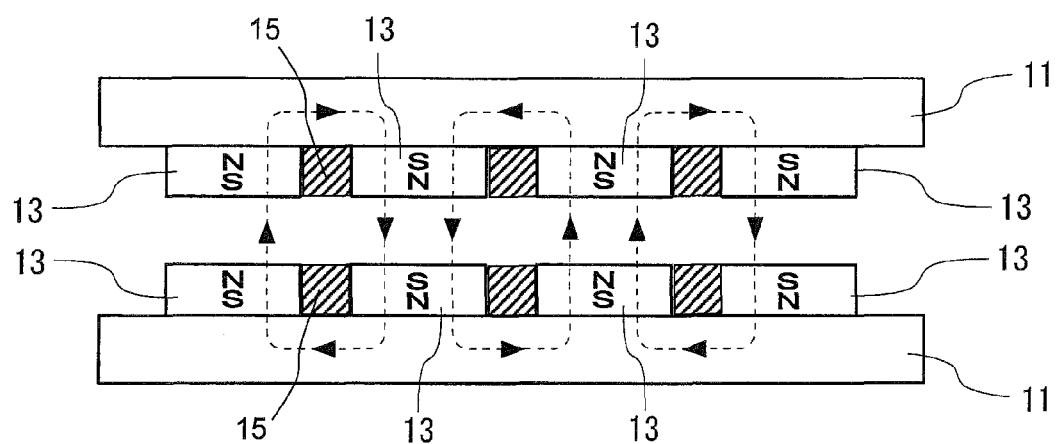
FIG. 3 is an explanation diagram illustrating an example of a flow of a magnetic flux of the linear motor.

In this case, the permanent magnets 13, as illustrated in FIG. 3, are arranged on respective facing surfaces of each yoke boards 11 with one pair (permanent magnet pair) corresponding to one group so as to face in each group. Each of the permanent magnets 13 is magnetized in the width direction. In this case, the pair of the two permanent magnets 13, 13 which face in the width direction has a configuration in which each permanent magnet 13 is arranged in order that an arrangement orientation of its magnetic pole (N pole or S pole) is mutually opposed to that of another one, further in which each permanent magnet 13 is arranged in order that an arrangement orientation of its magnetic pole (N pole or S pole) is mutually opposed to that of adjacent one.

Figure 4:
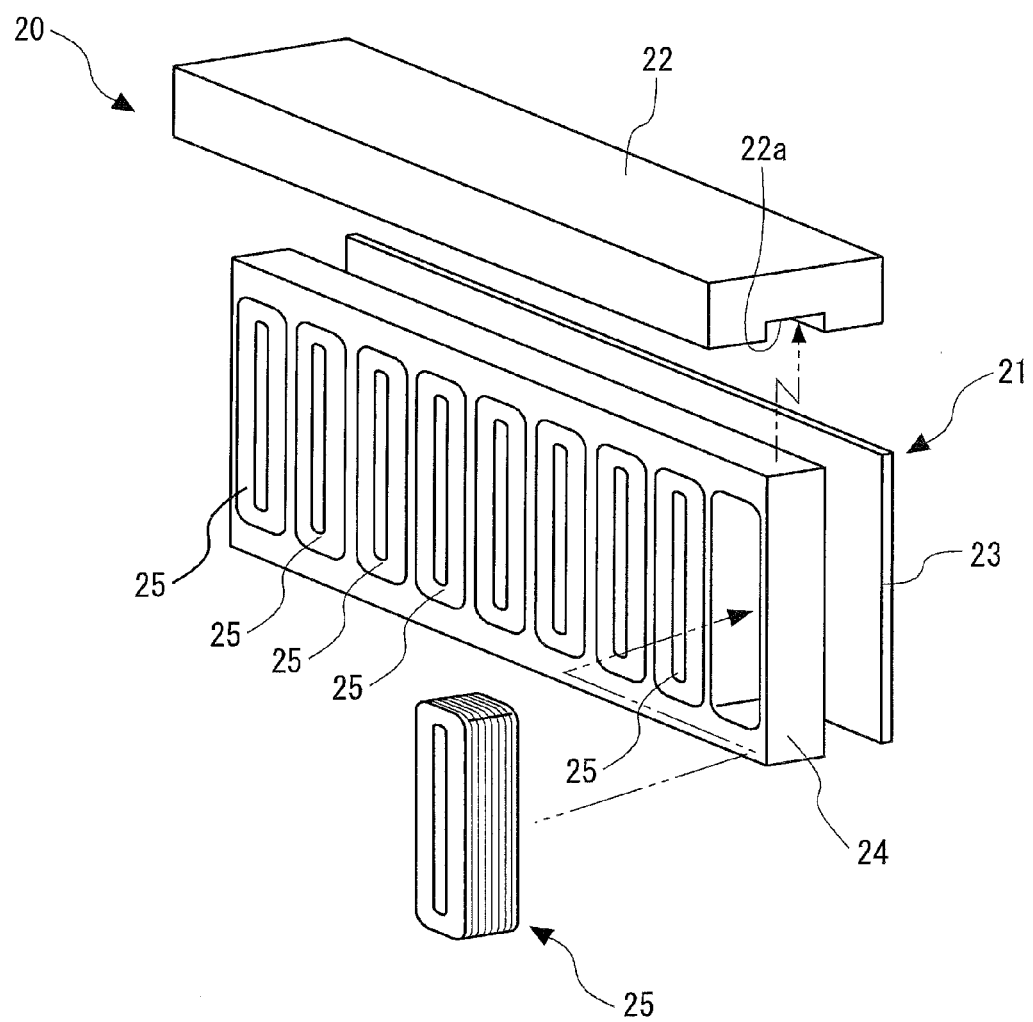
FIG. 4 is an exploded perspective view illustrating a mover.

<Configuration of the Mover 20>
The mover 20 includes an armature base 22 and the above-mentioned armature 21 as illustrated in FIG. 4 and FIG. 2. The armature 21 includes a printed board 23 and a plurality of armature coils 25. The armature base 22 has an almost rectangular parallelepiped form. The length of the armature base 22 in the longitudinal direction is shorter than the length of the stator 10 in the longitudinal direction. The printed board 23 is an almost rectangular thin plate and wirings (not illustrated) for respectively supplying electric power to the plurality of armature coils 25 are printed thereon.

The armature coil 25 is an air-cored coreless coil with concentrated winding, for example. Each of the armature coils 25 is fixed to one surface of the printed board 23 with a molding resin 24. As a result, all the plurality of armature coils 25 so molded and the printed board 23 are assembled as the almost plate-shaped armature 21. An upper side of the almost plate-shaped armature 21 is inserted into a grooved part 22a formed in a lower surface of the armature base 22 to be fixed. As a result, the entire armature 21 and the armature base 22 are assembled as the mover 20. Subsequently, the armature 21 which is disposed under the mover 20 is inserted into between the two permanent magnet arrays 16, 16 of the stator 10, thereby configuring the coreless linear motor 1. Incidentally, the configuration of the armature 21 is not limited to the above. For example, the armature coils 25 may be respectively arranged on the both sides of the printed board 23 in the thickness direction thereof.

<Plate Spring>

Figure 5A:
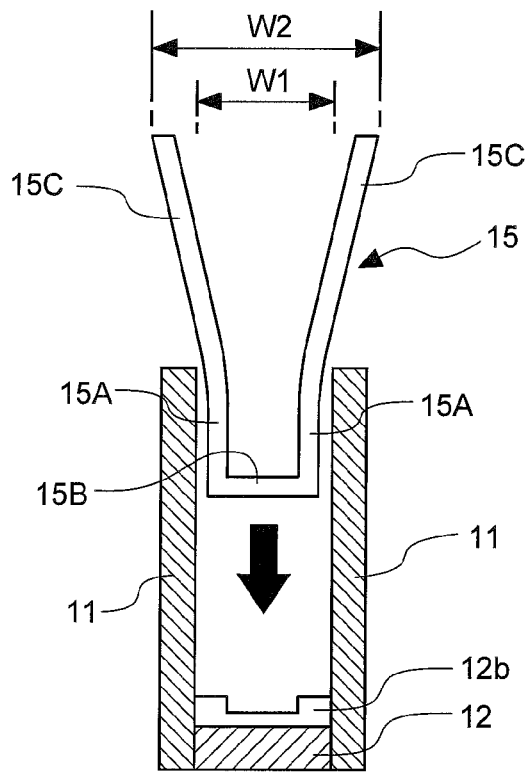
FIG. 5A is a front cross-sectional view of essential parts before attaching a plate spring to a yoke board.
Figure 5B:
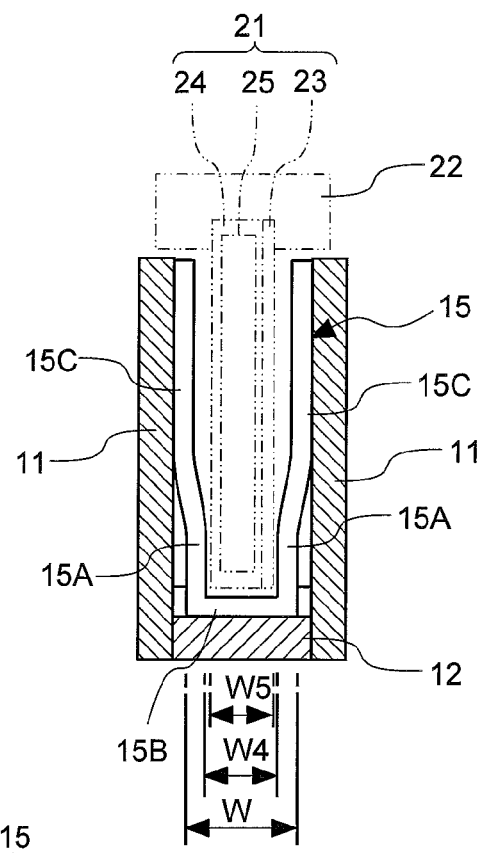
FIG. 5B is a front cross-sectional view of the essential parts with a state that the plate spring has been attached to the yoke board.
Figure 5C:
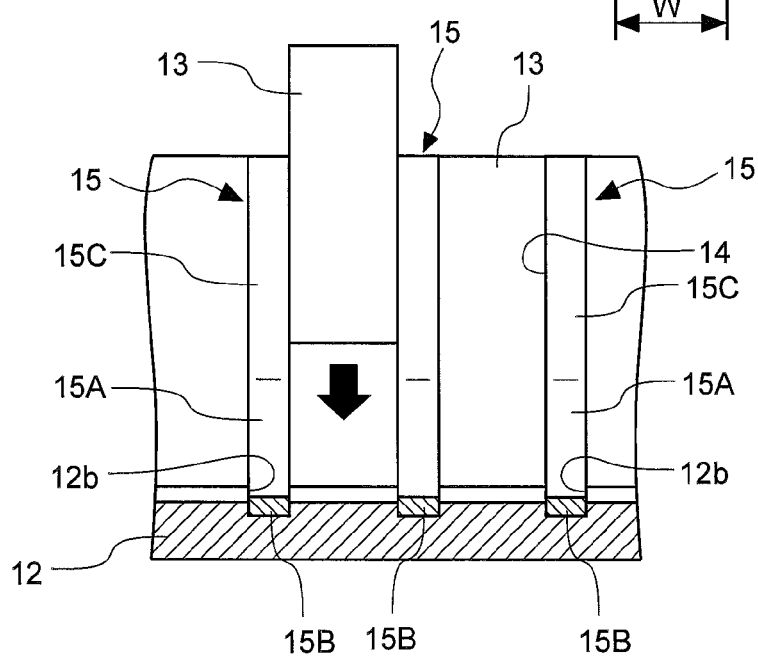
FIG. 5C is a side cross-sectional view of the essential parts with the state that the plate spring has been attached to the yoke board.

In the present embodiment, the plate spring 15 (corresponding to the elastic member and also corresponding to means for applying force) is arranged between the pair of two permanent magnets (in other words, in the space 14) which are mutually adjacent in the longitudinal. direction (corresponding to the moving direction) in the permanent magnet array 16 as illustrated in FIG. 3 and FIG. 1. Describing in detail, the plate spring 15 is arranged so as to be in contact with the two permanent magnets of each pair. Each of the plate springs 15 includes two force-applying parts 15A, 15A, a base part 15B placed on the yoke base 12, and two spreading parts 15C leading end sides of which spread out so as to be away from each other, as illustrated in FIG. 5A to FIG. 5C and above-mentioned FIG. 1. The two force-applying parts 15A, 15A respectively apply force the two yoke boards 11, 11. The base part 15B connects together the two force-applying parts 15A, 15A.

The recessed part 12b is formed in the upper surface of the yoke base 12 at a longitudinal direction position (in other words, a longitudinal direction position between the adjacent permanent magnets 13, 13) which matches the position of each space 14. The base part 15B is inserted into the recessed part 12b as illustrated in FIG. 5C. In this case, an outer width W of the base part 15B, as illustrated in FIG. 5B, is the same as or narrower than a width W1 (see FIG. 5A) of the facing surfaces of the two yoke boards 11, 11. In addition, an inner width W4 of the base part 15B is larger than a thickness W5 of the molding resin 24 including the printed board 23.

The force-applying parts 15A, 15A stand upward respectively from the both sides of the base part 15B. At least a part of the spreading part 15C has a width W2 which is wider than the width W1 of the facing surfaces of the two yoke boards 11, 11 as illustrated in FIG. 5A. As a result, ends on the other sides (upper sides in the example) of the two yoke boards 11, 11 are applied force in moving-away directions by fitting the plate spring 15 into the recessed part 12b.

Incidentally, the plate spring 15 is formed by bending a plate-shaped or bar-shaped metal member. Specifically, the plate spring 15 is formed by bending a plate (or a bar) made of a metal of the kind different from that of, for example, the yoke board 11. In this case, it is preferable that the material of the plate spring be high in strength and it is required to appropriately use a magnetic material or a non-magnetic material depending on the spring characteristics required.

<Operation and Advantage of the Embodiment>

In the linear motor 1 according to the present embodiment mentioned above, the field system including the permanent magnet arrays 16 is provided on the side of the stator 10; and the armature 21 is provided on the side of the mover 20. Any of three-phase alternating currents of U-phase, V-phase, and W-phase is supplied with an appropriate phase to the plurality of armature coils 25 included in the armature 21 of the mover 20 side. As a result, each armature coil 25 receives a propulsive force from the permanent magnet arrays 16 by which the armature coil 25 is sandwiched between the both sides in the width direction. Then, the entire of the mover 20 moves relative to the stator 10 along the longitudinal direction with the propulsive force. In this case, since upper ends of the two yoke boards 11, 11 are opened terminals, the yoke boards 11, 11 intend to mutually approach with the attractive forces of the facing permanent magnets 13. Incidentally, since lower ends of the two yoke boards 11, 11 are fixed by the yoke base 12, a relative positional relationship between them hardly changes.

Accordingly, in the present embodiment, the plate spring 15 is disposed on the stator 10. The plate spring 15 applies force the facing surfaces of the two yoke boards 11, 11 in directions that the upper ends of the two yoke boards 11, 11 move away from each other. Consequently, the yoke boards 11 are prevented from being deflected with the attractive forces of the permanent magnets 13 fixed to the facing surfaces of the two yoke boards 11, 11, thereby allowing a facing clearance between the two yoke boards 11, 11 to be almost constant. As a result, the yoke board 11 with thin and hence comparatively low in rigidity can be used, even when the permanent magnet 13 having a strong magnetic force is used. As a result, acquisition of high power is allowed while promoting size and weight reduction of the linear motor 1. In addition, since it is allowed to eliminate work of shaping each yoke board 11 into a form which is curved in a direction opposite to a direction in which the attractive force of the permanent magnet 13 is exerted so as to maintain the spacing between them constant, such an advantage is also obtained that working cost of the yoke boards 11 is saved. Incidentally, the elastic member is not limited to the plate spring 15. That is, a member of another form may be used as long as the member has a function of applying force the upper ends of the two yoke boards 11, 11 in the moving-away directions as mentioned above.

Moreover, in the present embodiment, particularly, the plurality of permanent magnet pairs each of which includes two permanent magnets 13 being arranged facing each other in the width direction and having mutually different polarities are arranged at predetermined intervals in the longitudinal direction. Then, the plate spring 15 is arranged between the longitudinally adjacent permanent magnets 13, 13 (in the space 14).

With the above arrangement, it is allowed to arrange the plate spring 15 without affecting the arrangement of the permanent magnets 13. In addition, the plurality of plate springs 15 may be arranged in the longitudinal direction at intervals as mentioned above, or one plate spring 15 may be arranged in the vicinity of the longitudinal center of the yoke board 11 (not illustrated) or the like. As a result, it is allowed to increase the degree of freedom in arrangement of the plate springs 15.

Moreover, in the present embodiment, particularly, the plate spring 15 is arranged so as to be in contact with the adjacent two pairs of permanent magnets which are arranged on the both sides in the longitudinal direction. As a result, it is allowed to position the permanent magnets 13 using the plate spring 15 when assembling the stator 10. That is, it is allowed to set the positions of the permanent magnets 13 to be arranged at equal intervals by closely arraying, for example, in order of the permanent magnet 13, the plate spring 15, the permanent magnet 13, the plate spring 15 and so on. As a result, no special tool for positioning a permanent magnet is used.

Moreover, in the present embodiment, particularly, the plate spring 15 formed by bending the plate-shaped metal member includes only the two force-applying parts 15A for respectively applying force the two yoke boards 11 and the base part 15B to be placed on the yoke base 12 with connecting the two force-applying parts 15A. With the above configuration, it is allowed to apply force the yoke boards 11 with a simple structure.

<Modified Embodiments>

Incidentally, the embodiment disclosed herein is not limited to the above and may be modified in a variety of ways without departing from the scope and technical sprit thereof.

(1) A case of the plate spring also having functions as a pole shoe:

In the above-mentioned embodiment, the permanent magnets 13 which are arranged on the facing surfaces of the yoke boards 11 are magnetized in the width direction as illustrated in FIG. 3. As a result, since a magnetic circuit is configured by passing through the yoke boards 11, the board thickness (wall thickness) of the yoke board 11 is increased to some extent.

Figure 6A:
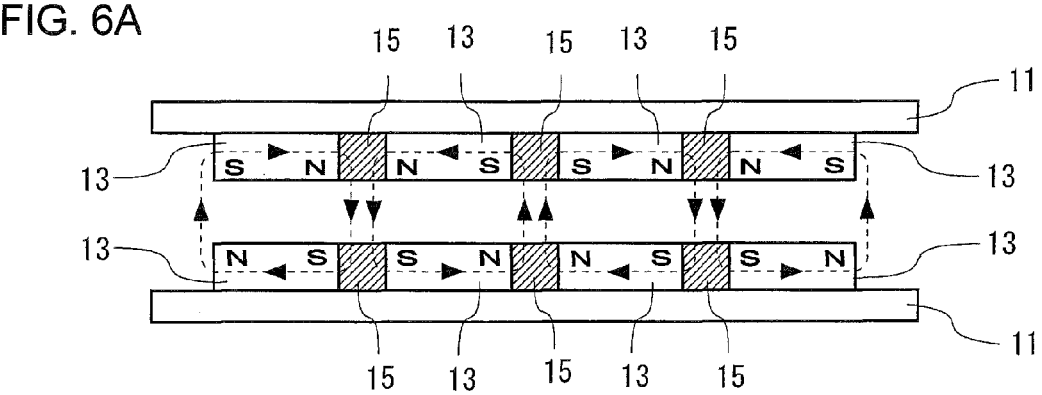
FIG. 6A is an explanation diagram illustrating a flow of a magnetic flux in one modified embodiment in which the plate spring also functions as a pole shoe.

On the other hand, in the present modified embodiment, the plurality of permanent magnets 13 are magnetized in the longitudinal direction (corresponding to the moving direction of the mover) as illustrated in FIG. 6A. Then, the plate spring 15 which is made of a magnetic material also functions as the pole shoe relative to the adjacent permanent magnets 13. In this case, the magnetic circuit is configured by the two permanent magnets 13, 13 (the permanent magnet pair) which mutually face in the width direction and the plate springs 15, 15 of magnetic material arranged on the both sides in the longitudinal direction. That is, the magnetic circuit is configured not passing through the yoke board 11. As a result, it is allowed to make the thickness of the yoke board 11 as thin as possible within a range that its mechanical strength is ensured and to make the yoke board 11 of a non-magnetic material. Therefore, further size and weight reduction of the linear motor 1 is promoted.

Figure 6B:
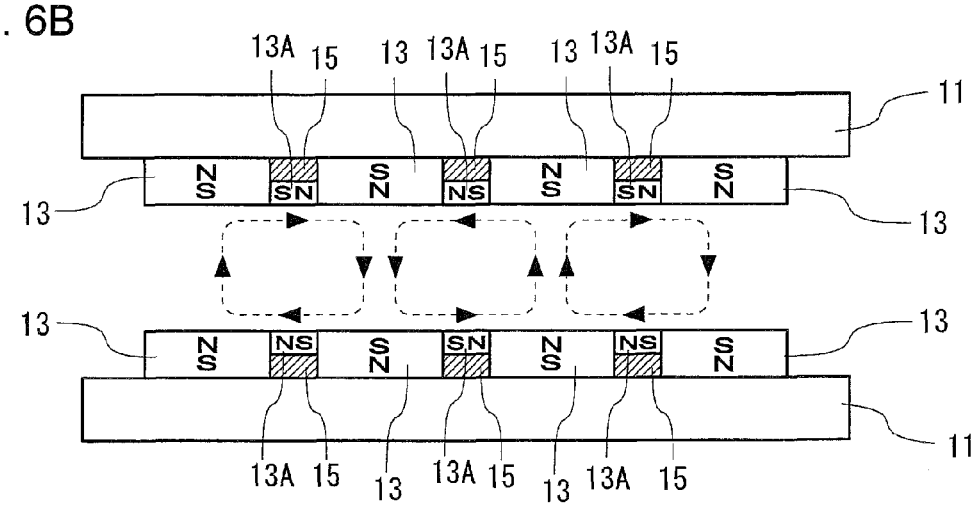
FIG. 6B is an explanation diagram illustrating a flow of a magnetic flux in other modified embodiment in which the permanent magnets are arranged into Halbach arrays.

(2) A case of using Halbach arrays:

In the present modified embodiment, the permanent magnet 13 (corresponding to a main pole magnet) which is magnetized in a direction (in other words, in the width direction) vertical to the yoke board 11, and the longitudinally magnetized permanent magnet 13A (corresponding to an interpole magnet) are provided as illustrated in FIG. 6B. The permanent magnet 13A is fixed to the non-magnetic plate spring 15 in the space 14 formed between the longitudinally adjacent permanent magnets 13, 13.

In the permanent magnet arrangement (so-called Halbach arrays) as mentioned above, the magnetization direction of the permanent magnet 13 is different from that of the permanent magnet 13A by 90 degrees. As a result, when fixing the respective magnets 13, 13A to the yoke boards 11, an attractive force or repulsive force is generated between the adjacent magnets 13 and 13A or between the magnet 13, 13A and the yoke board 11 due to a difference in magnetization direction. As a result, there is the possibility that the workability of the above-mentioned fixing work may be reduced and contact-induced damage such as a crack, a chip and the like may generate in the magnets 13, 13A.

Therefore, in the present modified embodiment, for example, such operational procedure is adopted that the non-magnetic plate spring 15 is attached to the yoke board 11 first, subsequently the permanent magnet 13 is attached to the yoke board 11, further subsequently the magnet 13A is bonded to the non-magnetic plate spring 15. As a result, no special tool for positioning the permanent magnet, the workability for fixing the magnets 13, 13A can be improved, and damage such as the crack, the chip and the like in the magnets 13, 13A can be avoided.

(3) Other

Incidentally, although the above-mentioned embodiment and modified embodiments have been described by taking the example that the linear motor 1 is configured such that the field system functions as the stator and the armature 21 functions as the mover, it is not limited to the above. That is, the linear motor 1 may be configured such that the field system functions as the mover and the armature 21 functions as the stator.

In addition to the above-mentioned embodiments, techniques of the embodiment and the modified embodiments may be utilized by appropriately combining them with one another.

In addition, though not illustrated one by one, the embodiment disclosed herein is performed by being modified in a variety of ways without departing from the scope of the present embodiment.

What is claimed is:

1. A linear motor, having a longitudinal direction and a width direction, in which one of a field system and an armature configured as a mover and the other configured as a stator, for relatively moving the field system and the armature along the longitudinal direction, the field system comprising:

two yoke boards that are arranged facing each other;

a yoke base to one side ends of the two yoke boards are fixed;

a plurality of permanent magnets respectively fixed to facing surfaces of the two yoke boards and arranged along a moving direction of the mover; and an elastic member configured to contact with the facing surfaces of the two yoke boards and to apply force to the facing surfaces in the width direction so that other side ends of the two yoke boards move away from each other.

2. The linear motor according to claim 1, wherein:

the elastic member is a plate spring formed by bending a plate-shaped metal member and includes two force-applying parts configured to respectively apply force to the two yoke hoards and a base part configured to connect together the two force-applying parts and disposed on the yoke base.

3. A linear motor, having a longitudinal direction and a width direction, in which one of a field system and an armature configured as a mover and the other configured as a stator, for relatively moving the field system and the armature along the longitudinal direction, the field system, comprising:

two yoke boards that are arranged facing each other;

a yoke base to which one side ends of the two yoke boards are fixed;

a plurality of permanent magnets respectively fixed to facing surfaces of the two yoke boards and arranged along a moving direction of the mover; and an elastic member configured to contact with the facing surfaces of the two yoke boards and to apply force to the facing surfaces in the width direction so that other side ends of the two yoke boards move away from each other, the plurality of permanent magnets being configured such that pairs of permanent magnets, each being configured by the two permanent magnets arranged facing each other and having different polarities with each other, are arranged along the moving direction at predetermined intervals, the elastic member that is a plate spring formed by bending a plate-shaped metal member, being arranged between the pairs of permanent magnets that are adjacent to each other in the moving direction, and the plate spring including two force-applying parts configured to respectively apply force to the two yoke boards and a base part configured to connect together the two force-applying parts and disposed on the yoke base.

4. The linear motor according to claim 3, wherein:
the elastic member is arranged so as to be in contact with each of the pairs of permanent magnets that are adjacent to each other in the moving direction.

5. The linear motor according to claim 4, wherein:
the plurality of permanent magnets are magnetized along the moving direction, and
the pair of permanent magnets and the elastic members arranged on both sides of the pair of permanent magnets configure a magnetic circuit.

6. The linear motor according to claim 4, wherein:
the plurality of permanent magnets include:
a main pole magnet that is magnetized along a direction orthogonal to the yoke board, and
an interpole magnet that is magnetized along the moving direction and fixed to the elastic member between pairs of the main pole magnets that are adjacent to each other in the moving direction.

7. The linear motor according to claim 1, wherein the two yoke boards are arranged facing each other in the width direction.

8. The linear motor according to claim 3, wherein the two yoke boards are arranged facing each other in the width direction.

* * * * *